United States Patent [19]

Seyerle

[11] 4,360,999
[45] Nov. 30, 1982

[54] LAWN MOWER INCLUDING PLANETARY CLUTCH/BRAKE

[75] Inventor: Carl E. Seyerle, Abingdon, Ill.

[73] Assignee: Outboard Marine Corporation, Waukegan, Ill.

[21] Appl. No.: 252,274

[22] Filed: Apr. 9, 1981

[51] Int. Cl.³ .......................................... A01D 69/10
[52] U.S. Cl. ................................ 56/11.3; 192/4 R; 74/785
[58] Field of Search ............. 56/11.3; 192/17 R, 4 R; 74/785, 760, 761

[56] References Cited

U.S. PATENT DOCUMENTS 2,902,888  9/1959  Powischill et al. ................. 74/761
4,148,173  4/1979  Hoff .................................... 56/11.3

FOREIGN PATENT DOCUMENTS 1024362  3/1966  United Kingdom ................. 74/760

Primary Examiner—Robert A. Hafer
Attorney, Agent, or Firm—Michael, Best & Friedrich

[57] ABSTRACT

Disclosed is a lawn mower including an input shaft selectively drivingly connected to an output shaft supporting the cutting blade. The lawn mower includes a sun gear driven by the input shaft, a first planetary gear in enmeshing relation with the sun gear and supported for rotation around the input shaft and for rotation about an axis parallel to the input shaft, and a ring gear surrounding the sun gear and the first planetary gear, and in enmeshing relation with the first planetary gear. A second planetary gear is drivingly connected to the first planetary gear, and is rotationally driven by the first planetary gear. A second sun gear is connected to the output shaft for driving the output shaft, the second sun gear being in enmeshing relation with the second planetary gear. Apparatus is further provided for alternately braking the ring gear and the output shaft.

18 Claims, 3 Drawing Figures

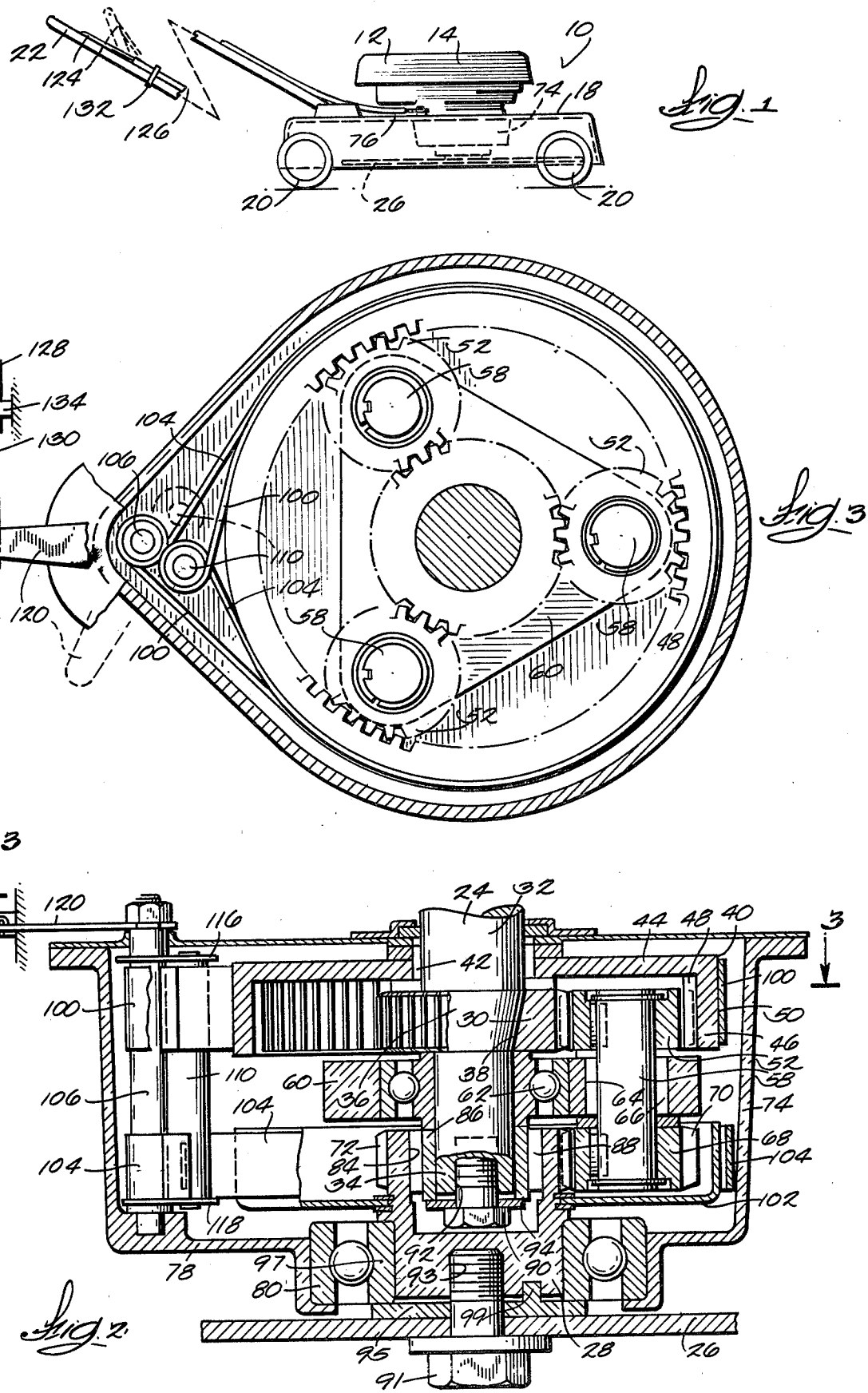

LAWN MOWER INCLUDING PLANETARY CLUTCH/BRAKE

FIELD OF THE INVENTION

The invention relates to lawn mowers and more particularly to means for transmitting the rotational drive from an input shaft to an output shaft, and for braking the output shaft.

BACKGROUND PRIOR ART

Examples of prior art planetary gear drive arrangements are illustrated in the Powischill et al. U.S. Pat. No. 2,902,888, issued Sept. 8, 1959; the Sharpe U.S. Pat. No. 2,343,333, issued Mar. 7, 1944; and the Briones U.S. Pat. No. 1,009,954, issued Nov. 28, 1911.

Attention is also directed to the Hardingham U.S. Pat. No. 593,652, issued Nov. 16, 1897; the Marr U.S. Pat. No. 765,498, issued July 19, 1904; and the McNamara U.S. Pat. No. 742,721, issued Oct. 27, 1903.

SUMMARY OF THE INVENTION

The invention includes a lawn mower having a blade housing, wheels for supporting the blade housing for movement along the ground and a rotary cutting blade supported in the blade housing. A prime mover is carried by the blade housing and includes a rotatably driven input shaft. An output shaft is drivingly connected to the cutter blade for rotatably driving the cutter blade, and means are provided for alternately drivingly connecting the input shaft to the output shaft and braking the output shaft. The driving means includes a sun gear driven by the input shaft, a first planetary gear in enmeshing relation with the sun gear and supported for rotation around the input shaft and for rotation about an axis parallel to the input shaft. A ring gear surrounds the sun gear and the first planetary gear, and is in enmeshing relation with the first planetary gear. The driving means also includes a second planetary gear drivingly connected to the first planetary gear and rotationally driven by the first planetary gear, a second sun gear connected to the output shaft for driving the output shaft, the second sun gear being in enmeshing relation with the second planetary gear, and means for alternately braking the ring gear and the output shaft.

In one embodiment of the invention the input shaft and the output shaft are in coaxial alignment and in end-to-end adjacent relation.

In one embodiment of the invention the ring gear is supported on the input shaft and is freely rotatable with respect to the input shaft.

One of the features of the invention is the provision in the means for alternately drivingly connecting the input shaft to the output shaft of means for supporting the first and second planetary gears for rotation around the input shaft, this means for supporting including a planet carrier supported on the input shaft for rotation with respect to the input shaft, a planet shaft supported by the planet carrier, the planet shaft being parallel to the input shaft and spaced from the longitudinal axis of the input shaft, and the planet shaft being freely rotatable with respect to the planet carrier.

Another of the features of the invention is the provision in the means for alternately braking the ring gear and the output shaft of a clutch band surrounding the ring gear, a brake drum fixed to the output shaft, a brake band surrounding the brake drum, and means for alternately causing clamping engagement of the clutch band with the ring gear and the brake band with the brake drum.

In one embodiment of the invention the clutch band includes opposite ends, one end being fixedly supported and the clutch band being wrapped around the ring gear in a first direction and being connected at its other end to a movable member. The brake band also includes opposite ends, one of those ends being fixedly supported, and the brake band is wrapped around the brake drum in a direction opposite to the direction of wrap of the clutch band. An opposite end of the brake band is connected to the movable member. The means for alternately causing clamping engagement of the clutch band with the ring gear and the brake band with the brake drum includes means for causing movement of the movable member between a first position wherein the clutch band clampingly engages the ring gear and a second position wherein the brake band clampingly engages the brake drum.

Various other features and advantages of the invention will be apparent by reference to the following description, to the claims, and to the drawings.

BRIEF DESCRIPTION OF THE DRAWINGS

FIG. 1 is an elevation view of a lawn mower embodying the present invention.

FIG. 2 is an enlarged cross sectional elevational view of the transmission employed in the lawn mower illustrated in FIG. 1 and embodying the invention.

FIG. 3 is a cross sectional view taken along line 3—3 in FIG. 2.

Before explaining one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in the drawings is a lawn mower 10 including an internal combustion engine 12 partially covered by a shroud 14 and supported on a frame including a blade housing 18. The mower 10 is supported for movement along the ground by wheels 20 and is guided by a guiding handle 22. The engine 12 includes a rotationally driven drive shaft or input shaft 24 (FIG. 2), and a cutting blade 26 is housed in the blade housing, the cutting blade being rotatably driven by an output shaft 28.

Means are also provided for selectively drivingly connecting the input shaft 24 to the output shaft 28 to thereby provide a driving connection between the engine 12 and the rotatable cutting blade 26. The means for drivingly connecting the input shaft 24 and the output shaft 28 includes means for alternatively providing driving connection of the input shaft and the output shaft and braking of the output shaft. This means for alternatively providing driving connection includes a sun gear 30 which is mounted on the input shaft for rotation with the input shaft. In the illustrated construction, the input shaft 24 includes a large diameter portion 32 and a lower smaller diameter portion 34 with a tapered shaft portion 36 joining the large diameter portion 32 and the lower small diameter portion 34. The sun gear includes a tapered central bore 38 complementary to the taper of the tapered portion 36 of the input shaft 24 such that when the sun gear 30 is forced onto the input shaft, the sun gear can be fixedly mounted on the input shaft for common rotation.

A ring gear 40 surrounds the sun gear 30 and is supported by a bearing 42 so as to be freely rotatable on the input shaft and freely rotatable with respect to the sun gear 30. The ring gear 40 includes a disc portion 44 and a peripheral flange 46, the peripheral flange 46 extending downwardly from the periphery of the disc 44 and having gear teeth 48 on its radially inner surface, the gear teeth being spaced radially outwardly from the sun gear. The peripheral flange 46 also includes a generally smooth exterior peripheral surface 50.

A number of planetary gears 52 are disposed between the sun gear 30 and the teeth 48 of the ring gear 40, the planetary gears 52 including teeth 54 meshing with the teeth 56 of the sun gear and also meshing with the teeth 48 of the ring gear. While in the illustrated embodiment three planetary gears 52 are shown, in other arrangements more or fewer planetary gears 52 can be employed.

The planetary gears 52 are each supported by planet shafts 58 which, in turn, are supported by a planet carrier 60. The planet carrier 60 in the illustrated embodiment comprises a triangular plate supported by a bearing 62 surrounding the input shaft 24, and the planet carrier 60 is disposed in side-by-side relation with the sun gear 30. The planet carrier is provided with bores 64 in each of its corners for housing a planet shaft 58. The planet shafts 58 are each supported in the bores 64 by bearings 66 which permit free rotation of the planet shafts 58 with respect to the planet carrier 60.

The planet shafts 58 each have a length which is sufficient to extend through the bores 64 in the planet carrier 60 and to permit planet gears to be supported on the opposite ends of the planet shafts 58. The planet gears 68 supported on the lower ends of the planet shafts 58 include gear teeth 70 which are supported in meshing engagement with gear teeth 72 which are integral with and surround the upper end of the output shaft 28, the gear teeth 72 forming a second sun gear.

In the illustrated construction, the gear arrangement shown in FIGS. 2 and 3 is surrounded by a gear case or housing 74. The housing 74 is secured to the deck 76 of the blade housing 18 and extends downwardly. The housing 74 includes a lower wall 78 having means for supporting a bearing 80, the bearing 80 in turn supporting the output shaft 28. The output shaft 28 includes on its upper end a flange 82 adapted to rest on the bearing 80 and to support the output shaft 28. The output shaft 28 also includes a bore 84 in its upper end for housing a portion of the lower end 34 of the input shaft 24. A race sleeve 86 and a pilot bearing 88 are housed in the bore 84 in the output shaft and surround the input shaft 24. The race sleeve 86 and the pilot bearing 88 are provided to maintain coaxial alignment of the input shaft and the output shaft and to permit free rotation of the input shaft with respect to the output shaft.

Means are also provided for retaining the sun gear 30, the planet carrier 60 and the race sleeve 86 on the input shaft in adjacent stacked relation. This means comprises a bolt 90 which is threadably housed in a threaded bore 92 in the end of the input shaft 24 and a washer 94 which abuts the race sleeve 86 and which can be forced against the race sleeve by the bolt 90.

Means are also provided for fixedly securing the cutting blade 26 to the output shaft 28. While this means can have various constructions, in the illustrated arrangement a bolt 91 extends through the cutting blade into a threaded bore 93 in the lower end of the output shaft 28. The bolt 91 can be employed to force the cutting blade upwardly against a driver plate 95 which in turn is forced against the inner race 97 of the bearing 80. A driving connection is provided between the driver plate 95 and the output shaft 28 by a pin 99 extending upwardly from the driver plate 95 and housed in a complementary bore in the output shaft 28 or by some other similar means such as a key or lug arrangement.

The means for alternatively providing a driving connection between the output shaft 28 and the input shaft 24 further includes means for alternatively braking the ring gear 40 and the output shaft 28, this means including a clutch band 100 surrounding the ring gear 40 and being selectively operable to engage the ring gear when tightened and to thereby prevent its rotation. The output shaft 28 includes a brake drum 102 fixedly attached thereto, and a brake band 104 surrounds the brake drum. The brake band 104 is selectively engageable with the brake drum 102 to stop its rotation.

Means are also provided to cause alternative tightening of the clutch band 100 around the ring gear 40 to thereby stop rotation of the ring gear and tightening of the brake band 104 around the brake drum 102 to thereby stop rotation of the brake drum. This means includes a first shaft 106 which is parallel to the input shaft 24 and adapted to fixedly support one end of the clutch band 100 on its upper end and one end of the brake band 104 on its lower end. The first shaft 106 is supported in the housing 74 at its upper and lower ends for limited rotation about its longitudinal axis. Also included is a second or movable shaft 110 parallel to the first shaft 106 and supported for movement between a first position or clutch engaging position shown in solid lines in FIG. 3 and a second or brake position shown in phantom in FIG. 3. As also shown in FIG. 3, the clutch band 100 is connected at one end to the first shaft 106 and extends around the ring gear 40 in a counterclockwise direction as seen in FIG. 3. The opposite end of the clutch band 100 is fixed to the movable shaft 110. The brake band 104 is fixed to the first shaft 106 and is wrapped around the brake drum 102 in a clockwise direction as seen in FIG. 3. The opposite end of the brake band 104 is fixed to the movable shaft 110.

Means are also provided for supporting the second or movable shaft 110 for movement between the first and second positions. This means includes a pair of links 116 and 118 fixedly supported on opposite ends of the first shaft 106 and supporting the second shaft 110 for arcuate movement about the axis of the first shaft in common therewith. The links 116 and 118 are fixedly connected to the first shaft 106 whereby rotation of the first shaft 106 about its axis will cause movement of the second shaft 110 between the first and second positions.

As will be appreciated by reference to FIG. 3, when the shaft 110 is in the position shown in solid lines in FIG. 3, the clutch band 100 clampingly engages the ring gear 40 thereby preventing its rotation. At the same time the brake band 104 will be loose on the brake drum 102 and will not clampingly engage the brake drum 102 whereby the output shaft 28 is freely rotatable. When the second shaft 110 is moved to the second position shown in phantom, the clutch band 100 releases the ring gear 40 and the brake band 104 tightens around the brake drum 102 such that the brake drum 102 and the output shaft 28 are braked.

Means are further provided for causing movement of the second or movable shaft 110 between the first position and the second position. While various arrangements can be provided, in the illustrated construction, the means for causing movement of the second or movable shaft 110 includes a lever 120 having one end fixedly connected to the upper end of the first shaft 106 and for causing rotation of the first shaft 106 about its axis. Movement of the lever 120 to a first position causes movement of the second shaft 110 to a position wherein the clutch band 100 engages the ring gear 40. Movement of the lever 120 to second position causes rotation of the first shaft 106 and movement of the second shaft 110 to the second position wherein the brake band 104 clampingly engages the brake drum 102. Also included is a control handle 124 (FIG. 1) mounted on the guiding handle 22 for oscillatory movement and connected to the lever 120 through a suitable linkage arrangement. While the linkage arrangement could have various constructions, in the illustrated construction it comprises a push-pull element or cable 126 having a sheath 128 and a central core 130 which is movable within the sheath. One end of the sheath 128 is secured to the guiding handle by a bracket 132 and an opposite end of the sheath is secured against movement by a bracket 134 attached to the housing 18. One end of the core 130 is connected to the control handle 124 and the opposite end of the core 130 is connected to the free end of the lever 120 whereby oscillatory movement of the control handle 124 will result in pivoting of the lever 120.

In operation of the transmission illustrated in FIGS. 1 and 2, the input shaft 24 continually drives the sun gear 30 and the sun gear 30 in turn drives the planetary gears 52. When the control handle 124 is pulled toward the guiding handle 22, the core 130 of the cable 126 pulls the lever 120 to the position shown in solid lines in FIG. 3 and the clutch band 100 is tightened. The ring gear 40 is thus prevented from rotating. The rotation of the sun gear 30 will rotatably drive the planetary gears 52, and since the ring gear 40 is restrained against movement, the planetary gears 52 will be caused to rotate around the axis of the input shaft 24. This rotation of the first planetary gears 52 is transmitted to the second planetary gears 68 such that they are also caused to rotate about their axes and around the axis of the output shaft 28. This movement of the planetary gears 68 causes the sun gear 72 on the output shaft 28 to be rotated at the same rotational speed as the first sun gear 30. Thus, the sun gears 30 and 72 and planetary gears 52 and 68 shown in the drawings produce a one-to-one driving connection between the input shaft 24 and the output shaft 28.

When the movable or second shaft 110 is shifted to the second position wherein the brake drum 102 is clampingly engaged by the brake band 104 and the sun gear 72 is braked. At the same time, the ring gear 40 becomes freely rotatable since the clutch band 100 no longer clampingly engaging the ring gear 40. Since the sun gear 72 on the output shaft 28 is braked, the planetary gears 68 and 52 are caused to be driven around the sun gears 72 and 30, respectively. This rotation of the planetary gears 52 is permitted because the ring gear 40 is freely rotatable around the axis of the input shaft 24.

While in the illustrated construction, the gear ratios of the sun gears and planetary gears produce a one-to-one driving connection between the input shaft and the output shaft, in other arrangements the gear ratios could be selected so as to produce either a speed reduction or a speed increase.

Various features of the invention are set forth in the following claims.

I claim:

1. A lawn mower comprising a blade housing, wheel means for supporting said blade housing for movement along the ground, a rotary cutting blade supported in said blade housing, a prime mover carried by said blade housing, said prime mover including a rotatably driven input shaft, said input shaft having a longitudinal axis, an output shaft drivingly connected to said cutter blade for rotatably driving said cutter blade, and means for alternately drivingly connecting said input shaft to said output shaft and braking said output shaft, said means for alternately drivingly connecting and braking including a sun gear driven by said input shaft, a first planetary gear in enmeshing relation with said sun gear and supported for rotation around said input shaft and for rotation about an axis parallel to said longitudinal axis, a ring gear surrounding said sun gear and said first planetary gear and in enmeshing relation with said first planetary gear, a second planetary gear drivingly connected to said first planetary gear, and rotationally driven by said first planetary gear, a second sun gear connected to said output shaft for driving said output shaft, said second sun gear being in enmeshing relation with said second planetary gear, and means for alternately braking rotation of said ring gear and said output shaft.

2. A lawn mower as set forth in claim 1 wherein said input shaft and said output shaft are in coaxial alignment and in end-to-end adjacent relation.

3. A lawn mower as set forth in claim 1 wherein said ring gear is supported on said input shaft and is freely rotatable with respect to said input shaft.

4. A lawn mower as set forth in claim 1 wherein said means for alternately drivingly connecting and braking includes means for supporting said first and second planetary gears for rotation around said input shaft, said means for supporting including a planet carrier supported for rotation around said longitudinal axis, a planet shaft supported by said planet carrier, said planet shaft being parallel to said input shaft and spaced from said longitudinal axis, and said planet shaft being freely rotatable with respect to said planet carrier.

5. A lawn mower as set forth in claim 4 wherein one of said planetary gears is fixedly supported on one end of said planet shaft and the other of said planetary gears is fixedly supported on an opposite end of said planet shaft.

6. A lawn mower as set forth in claim 1 wherein said means for alternately drivingly connecting and braking includes means for drivingly connecting said first planetary gear to said second planetary gear such that rotation of said first planetary gear causes rotation of said second planetary gear.

7. A lawn mower as set forth in claim 1 wherein said means for alternately braking includes a clutch band surrounding said ring gear, a brake drum fixed to said output shaft, a brake band surrounding said brake drum, and means for alternately causing clamping engagement of said clutch band with said ring gear and said brake band with said brake drum.

8. A lawn mower as set forth in claim 7 wherein said clutch band includes opposite ends, one of said ends being fixedly supported, said clutch band being wrapped around said ring gear in a first direction and being connected to a movable member, wherein said brake band includes opposite ends, one of said ends being fixedly supported, and said brake band being wrapped around said brake drum in a direction opposite said first direction and being connected to said movable member, and wherein said means for alternately causing clamping engagement includes means for causing movement of said movable member between a first position wherein said clutch band clampingly engages said ring gear and a second position wherein said brake band clampingly engages said brake drum.

9. A lawn mower comprising a blade housing, wheel means for supporting said blade housing for movement along the ground, a rotary cutting blade supported in said housing, a prime mover carried by said blade housing, said prime mover including a rotatably driven input shaft, an output shaft drivingly connected to said cutter blade for rotatably driving said cutter blade, and means for alternately drivingly connecting said input shaft to said output shaft and braking said output shaft, said means for alternately drivingly connecting and braking comprising a planetary gear train connected to said output shaft and including a ring gear mounted for rotation relative to said input shaft, and means for alternately braking rotation of said ring gear and said output shaft.

10. A combined clutch and brake comprising a rotatably driven input shaft, an output shaft adapted to be rotatably driven, and means for alternately drivingly connecting said input shaft to said output shaft and braking said output shaft, said means for alternately drivingly connecting and braking comprising a planetary gear train connected to said output shaft and including a ring gear mounted for rotation relative to said input shaft, and means for alternately braking rotation of said ring gear and said output shaft.

11. A combined clutch and brake comprising a rotatably driven input shaft, said input shaft having a longitudinal axis, an output shaft adapted to be rotatably driven, and means for alternately drivingly connecting said input shaft to said output shaft and braking said output shaft, said means for alternately drivingly connecting and braking including a sun gear driven by said input shaft, a first planetary gear in enmeshing relation with said sun gear and supported for rotation around said input shaft and for rotation about an axis parallel to said longitudinal axis, a ring gear surrounding said sun gear and said first planetary gear and in enmeshing relation with said first planetary gear, a second planetary gear drivingly connected to said first planetary gear, and rotationally driven by said first planetary gear, a second sun gear connected to said output shaft for driving said output shaft, said second sun gear being in enmeshing relation with said second planetary gear, and means for alternately braking rotation of said ring gear and said output shaft.

12. A combined clutch and brake as set forth in claim 11 wherein said input shaft and said output shaft are in coaxial alignment and in end-to-end adjacent relation.

13. A combined clutch and brake as set forth in claim 11 wherein said ring gear is supported on said input shaft and is freely rotatable with respect to said input shaft.

14. A combined clutch and brake as set forth in claim 11 wherein said means for alternately drivingly connecting and braking includes means for supporting said first and second planetary gears for rotation around said input shaft, said means for supporting including a planet carrier supported for rotation around said longitudinal axis, a planet shaft supported by said planet carrier, said planet shaft being parallel to said input shaft and spaced from said longitudinal axis, and said planet shaft being freely rotatably with respect to said planet carrier.

15. A combined clutch and brake as set forth in claim 14 wherein one of said planetary gears is fixedly supported on one end of said planet shaft and the other of said planetary gears is fixedly supported on an opposite end of said planet shaft.

16. A combined clutch and brake as set forth in claim 11 wherein said means for alternately drivingly connecting and braking includes means for drivingly connecting said first planetary gear to said second planetary gear such that rotation of said first planetary gear causes rotation of said second planetary gear.

17. A combined clutch and brake as set forth in claim 11 wherein said means for alternately braking includes a clutch band surrounding said ring gear, a brake drum fixed to said output shaft, a brake band surrounding said brake drum, and means for alternately causing clamping engagement of said clutch band with said ring gear and said brake band with said brake drum.

18. A combined clutch and brake as set forth in claim 17 wherein said clutch band includes opposite ends, one of said ends being fixedly supported, said clutch band being wrapped around said ring gear in a first direction and being connected to a movable member, wherein said brake band includes opposite ends, one of said ends being fixedly supported, and said brake band being wrapped around said brake drum in a direction opposite said first direction and being connected to said movable member, and wherein said means for alternately causing clamping engagement includes means for causing movement of said movable member between a first position wherein said clutch band clampingly engages said ring gear and a second position wherein said brake band clampingly engages said brake drum.

* * * * *